United States Patent [19]

Dunlavy

[11] Patent Number: 5,444,686

[45] Date of Patent: Aug. 22, 1995

[54] METHOD AND APPARATUS FOR CORRECTING DISTORTION IN COMPACT DISC RECORDING AND PLAYBACK SYSTEM

[76] Inventor: John H. Dunlavy, 2826 Tenderfoot Hill St., Colorado Springs, Colo. 80906

[21] Appl. No.: 128,349

[22] Filed: Sep. 28, 1993

[51] Int. Cl.$^6$ .............................................. G11B 7/00
[52] U.S. Cl. ........................................ 359/48; 369/54; 369/32
[58] Field of Search ................. 369/48, 54, 59, 60, 369/47, 44.32, 32; 360/32, 31, 53, 46, 65, 27

[56] References Cited

U.S. PATENT DOCUMENTS

| | | | |
|---|---|---|---|
| 3,795,902 | 3/1974 | Russell | 369/48 |
| 3,891,794 | 6/1975 | Russell | 369/48 |
| 4,688,113 | 8/1987 | Parsons | 360/31 |
| 4,788,674 | 11/1988 | Maeda et al. | 369/116 |
| 5,072,435 | 12/1991 | Baky | 369/48 |
| 5,077,623 | 12/1991 | McSweeney | 360/31 |
| 5,121,263 | 6/1992 | Kerwin et al. | 360/31 |
| 5,268,893 | 12/1993 | Call et al. | 369/54 |
| 5,309,419 | 5/1994 | Koike | 369/54 |

Primary Examiner—Scott J. Sugarman
Assistant Examiner—Nabil Hinsi
Attorney, Agent, or Firm—Haynes and Boone

[57] ABSTRACT

Method and apparatus for correcting distortion in a CD recording and playback system is disclosed. In an improved CD recording and playback system of the present invention, a complex reference signal having precisely defined amplitude and frequency properties is recorded on an information track of a CD prior to the beginning of the audio track(s). During playback of the CD, the reference signal is read from the CD and compared with a identical copy of the reference signal, which is stored in a memory device within the playback system. By means of such comparison, every discernible and measurable difference between the read and the stored reference signals are established, defined and converted into a difference-information signal, which is used to resolve the necessary corrections that must be made in the playback system to render the two reference signals identical with respect to all amplitude components versus frequency and time components, as well as to correct the frequency and amplitude properties of the playback system in a manner that results in the playback system having a degree of accuracy that renders the reproduced signals virtually indistinguishable from the source signals.

15 Claims, 3 Drawing Sheets

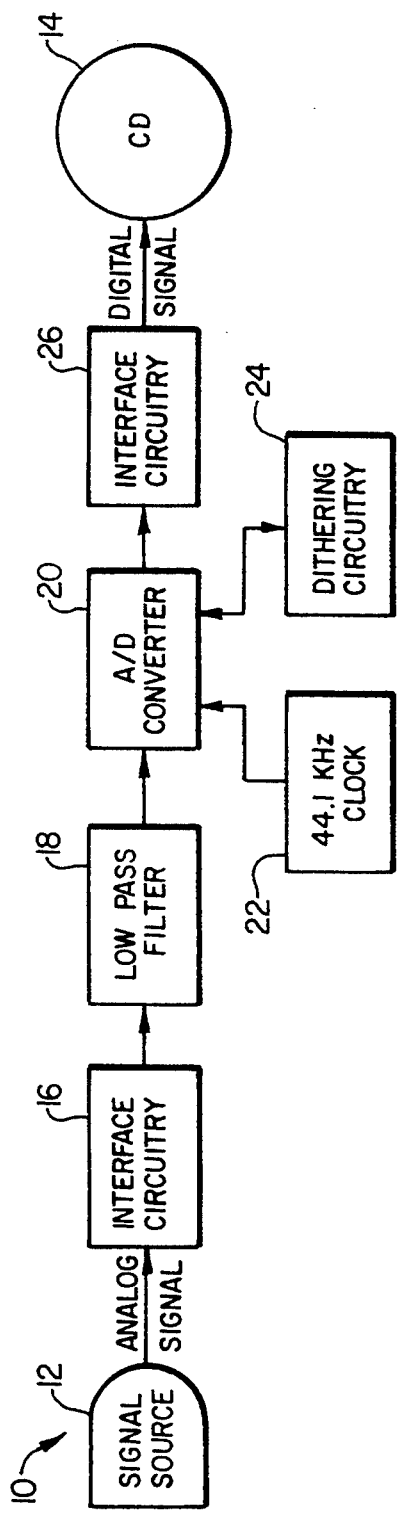
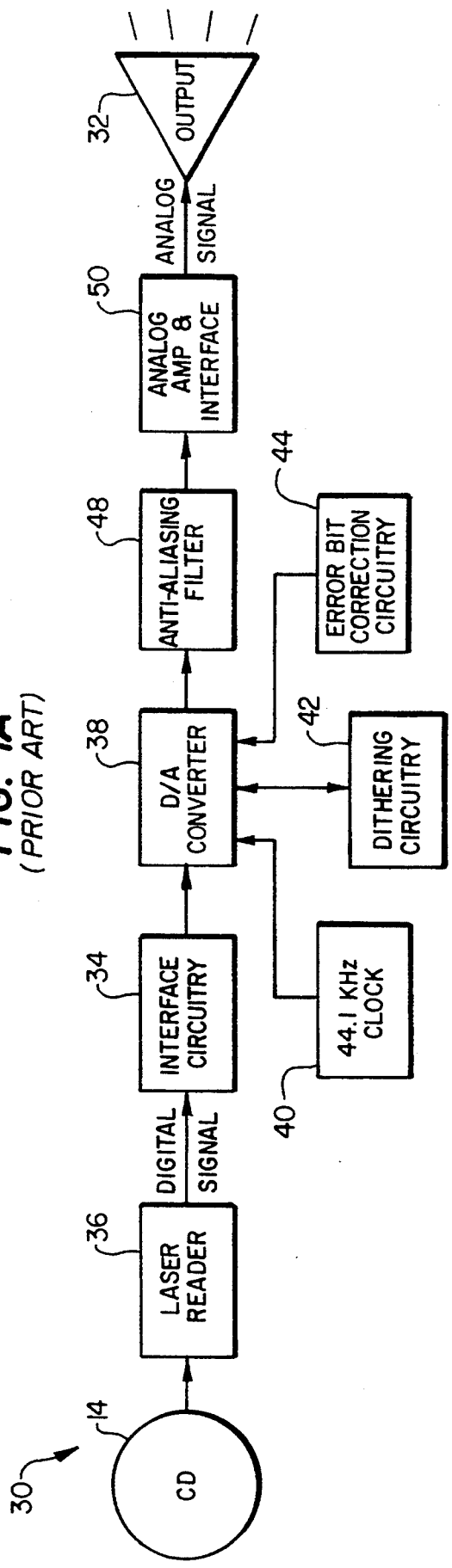

METHOD AND APPARATUS FOR CORRECTING DISTORTION IN COMPACT DISC RECORDING AND PLAYBACK SYSTEM

TECHNICAL FIELD

The invention relates generally to compact disc recording and playback systems and, more specifically, to method and apparatus for correcting the linear distortion in such systems.

BACKGROUND OF THE INVENTION

Systems and media for recording and reproducing audio information have evolved through several stages throughout history, including mechanical, magnetic and, most recently, optical technology. Advances in audio technology have led to improvements in the quality as well as the efficiency of audio systems. In the quest to develop the ideal recording and playback system, several features have been targeted for improvement, including quality and ease of reproduction, storage capacity, cost, durability and transportability of recording media, and overall system size. Therefore, although magnetic systems are years ahead of optical systems in terms of technical development, optical systems enjoy several advantages over their magnetic counterparts with respect to the above-identified features.

Compact discs (CDs) have introduced more people to digital audio systems than have any other medium. CDs contain digitally encoded audio information in the form of pits impressed onto their surface, which information is written to the CD using a recording system and later reproduced as sound using a playback system. While the reproduction accuracy of recording and playback systems for CDs has improved dramatically since their introduction to the consumer market during the early 1980s, a considerable amount of distortion still remains and although the amplitude of such distortion is relatively small, it is audible and distracting to audiophiles.

Much of the subject distortion is generated within the 16-bit analog-to-digital (A/D) and digital-to-analog (D/A) conversion circuitry, anti-aliasing circuitry and dithering circuitry of recording and playback systems and is attributable to several causes. First, 16-bit digital resolution, which is standard for consumer CDs, is inadequate for accurate reproduction of complex musical sounds. It is well known that at least 20 bits are required to achieve the accuracy and dynamic range needed to reproduce such complex sounds. As a result, a significant amount of quantization error is introduced when a sample of an analog signal is measured and assigned an approximate amplitude value.

A second cause of distortion results from attempts to reduce this quantization error. A technique referred to in the art as "dithering" involves the introduction of a small amount of white noise to an analog signal before the signal is digitally encoded. While dithering effectively expands the dynamic range of the system at very low signal levels, it does so at the expense of introducing a certain amount of nonlinearity and noise.

A final cause of distortion is the inadequate standard sampling rate for consumer CDs (44.1 kHz), which results in a significant ringing caused by the (sin X)/X components and phase distortion caused by the anti-aliasing filter circuits.

The decision to adopt 16-bit digital resolution and a 44.1 kHz sampling rate as standard for consumer CDs was made at a time when the available technology and price constraints dictated a compromise acceptable to a variety of international entities with competing interests. At the time, many of the interested parties were of the opinion that only 12 bits and 20 kHz were necessary to satisfy consumer demands. More recently, however, it has become obvious that the present standard is inadequate.

Many attempts have recently been made to solve the above-described distortion problem. For example, different types of D/A converters have been developed which use very sophisticated digital processing technology to improve the linearity of the standard 16-bit/44.1 kHz format. However, all such digital converters, while offering some audible improvement in smoothness, detail resolution and linearity at low signal levels, remain expensive to implement and fall far short of meeting current consumer demands.

Therefore, what is needed is an improved means for correcting distortion in a CD recording and playback system that does not greatly increase the cost of the system.

SUMMARY OF THE INVENTION

The foregoing problems are solved and a technical advance is achieved by method and apparatus for correcting distortion in a CD recording and playback system. In a departure from the art, a complex reference signal having precisely defined amplitude and frequency properties is recorded at the beginning of a CD prior to the beginning of the audio track(s). During playback of the CD, the reference signal is read from the CD and compared with a identical copy of the reference signal, which copy is stored in a memory device within the playback system. By means of such comparison, every discernible and measurable difference between the read and the stored reference signals are established, defined and converted into a difference-information signal.

The difference-information signal is then used to resolve the corrections that must be made in the playback system to render the two reference signals identical with respect to all amplitude components versus frequency and time components. This correction data is input to a D/A converter of the playback system in the form of an error correction signal to correct the frequency and amplitude properties of the playback system in a manner that results in the playback system having a degree of accuracy that renders signals reproduced using the playback system virtually indistinguishable from the source signals from which they derive.

In an illustrative embodiment, the recording and playback system of the present invention includes a first reference signal generator, which comprises a read-only-memory (ROM) device, in which is stored a precise copy of the reference signal, and a suitable D/A converter, and which is connected to the analog input of an otherwise conventional CD recording system.

A comparator circuit is connected to receive the output of a D/A converter of an otherwise conventional CD playback system and also to a second reference signal generator, which comprises a ROM device, in which is stored a precise replica of the reference signal stored within the first reference signal generator, and a suitable D/A converter. The output of the comparator circuit is input to the aforementioned D/A converter of the playback system.

In accordance with the method of the present invention, the analog reference signal stored as a digital signal in the first reference signal generator is recorded on a CD information track, which is located at the center of the CD prior to the beginning of the audio track(s). During playback of the CD, the comparator circuitry is used to compare the reference signal read from the CD with the reference signal generated by the second reference signal generator and to generate a signal indicative of the difference therebetween to the D/A converter. The D/A converter uses this signal to linearize the playback system, as previously described.

A technical advantage achieved with the invention is that it is fully compatible with prior art CD recording and playback systems.

Another technical advantage achieved with the invention is that it enables a greater reduction in distortion than that enabled by available digital processors and other techniques for reducing distortion, but at a fraction of the cost.

BRIEF DESCRIPTION OF THE DRAWINGS

FIG. 1a is a block diagram of a prior art CD recording system.

FIG. 1b is a block diagram of a prior art CD playback system.

DESCRIPTION OF THE PRIOR ART

Figure 2A:
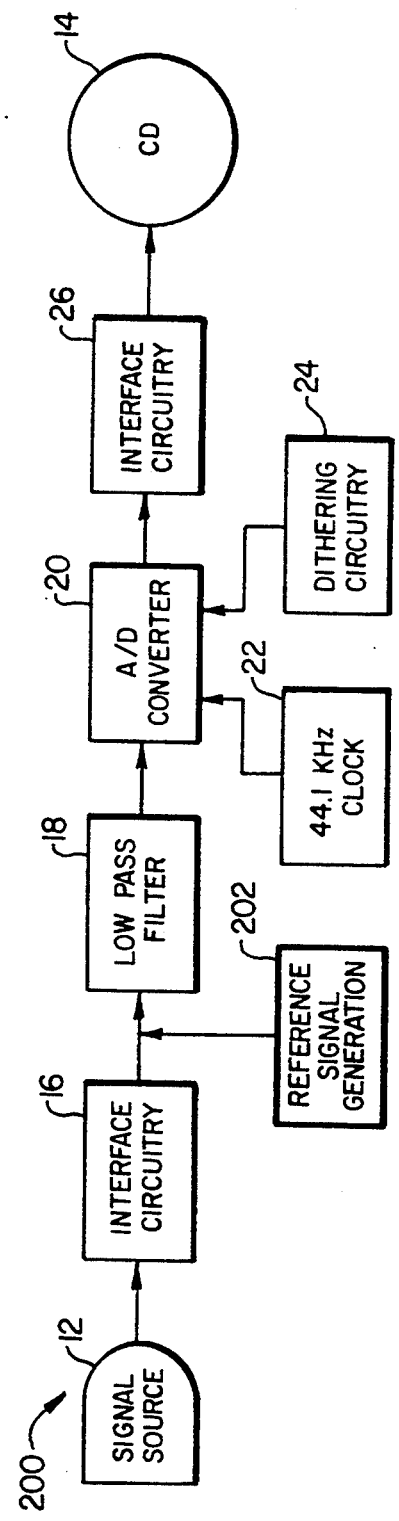
FIG. 2a is block diagram of a CD recording system embodying features of the present invention.

FIG. 1a is a block diagram of a conventional prior art CD recording system 10 for digitally encoding an analog input signal produced by a signal source 12 and recording same on a CD 14. The system 10 typically comprises interface circuitry 16 for interfacing the signal source 12 with the input of a low-pass filter 18, which filter 18 bandlimits the input signal to prevent aliasing caused by unexpected high frequencies that may have been introduced into the system 10. The output of the filter 18 is connected to an input of a 16-bit analog-to-digital (A/D) converter 20.

A highly accurate 44.1 kHz clock signal from a clock 22 is input to the A/D converter 20 to synchronize the sampling rate of the converter 20 to a standard 44.1 kHz. Dithering circuitry 24 is also connected to the converter 20 for dithering the least significant digital bit ("LSB") of a digitally encoded signal to eliminate the sharp cut-off which would otherwise result when the amplitude of the input signal drops below a certain minimum level. The dithering circuitry 24 modulates the LSB of the digitally encoded signal at a quasi-random rate with a white noise-type signal to increase the dynamic range of the recording system 10 and the playback system (FIG. 1a) at low amplitudes. The technique of dithering is well known in the art and will therefore not be further described herein. The A/D converter 20 digitally encodes the input signal and the resultant digital signal is output from the converter 20, throughput to interface circuitry 26 and then recorded on the CD 14 by conventional means.

FIG. 1b is a block diagram of a typical prior art CD playback system 30 for converting a digitally encoded signal read from the CD 14 to an analog signal to be received by a listener at an output 32. The system 30 comprises interface circuitry 34, connected between a laser reader 36 and a digital-to-analog (D/A) converter 38, for buffering and conditioning the signal read from the CD 14 using the laser reader 36, to match the input requirements of the D/A converter 38 with respect to amplitude level and impedance. A clock signal from a clock 40, which has a frequency identical to that of the clock 22, is input to the D/A converter 38 for synchronizing the sampling rate of the system 30. Dithering circuitry 42 is coupled to the D/A converter 38 to optimize the dynamic range of the original input signal at low levels provided by the use of the dithering circuitry 24 of the recording system 10. Bit error correction circuitry 44 is coupled to the D/A converter 38 for detecting missing or incorrect bits in the digital bit stream read from the CD 14 and for suitably correcting the digital bit stream to minimize distortion.

The digital signal read from the CD 14 is input to the D/A converter 38, via the interface circuitry 34, which converter decodes the digital signal into a corresponding analog signal. The analog signal output by the D/A converter 38 is throughput to a suitable anti-aliasing filter 48, which filters out the digital bit stream "hash" and other distortion components to minimize distortion and noise in the analog signal. An analog amplifier circuit 50 is connected to receive the output of the filter 48 and to raise the amplitude of the signal to a level commensurate with the range of amplitudes standard for the system 30. The amplified signal is then output to a listener via the output 32.

DESCRIPTION OF THE PREFERRED EMBODIMENT

As previously indicated, the present invention relates to a method and apparatus for improving the sound quality of CD recording and playback systems. It is intended that a preferred embodiment of the invention be compatible with prior art CD recording and playback systems, such as the systems 10 and 30, so that CDs recorded in accordance with the present invention, using a CD recording system embodying features of the present invention (FIG. 2a), may be played back on a prior art playback system (FIG. 1b) without incurring any loss in quality that would have been achieved had the CDs been recorded using a prior art recording system (FIG. 1a). It is further intended that a CD playback system embodying features of the present invention (FIG. 2b) be capable of playing conventionally-recorded CDs without adding to the distortion that already exists with respect to prior art CD playback systems (FIG. 1b).

Figure 3:
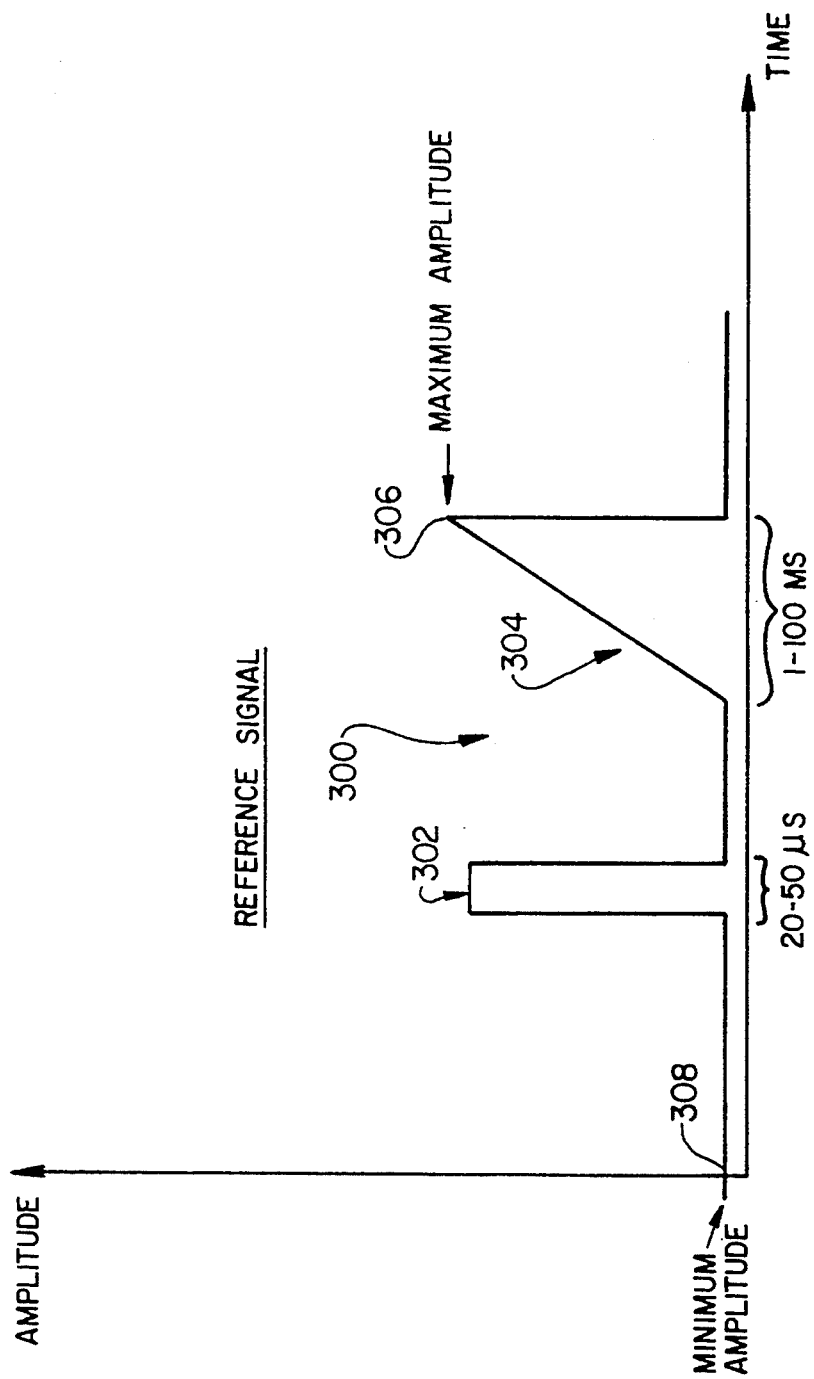
FIG. 3 is a timing diagram of an analog form of a complex reference signal of the present invention.

The present invention involves a cooperative process between CD recording and playback systems in which a complex "reference signal," such as the signal illustrated in FIG. 3, is recorded on an information track of a CD, which is located at the center of the CD prior to the beginning of the audio track(s). A CD recording system embodying features of the present invention is shown in FIG. 2a and includes each of the components shown in and described in connection with FIG. 1a, which components are given the same reference numerals for the sake of clarity. As in the system 10 of FIG. 1a, the system 200 of FIG. 2a is used for digitally encoding an analog signal produced by the signal source 12 and recording same on the CD 14, and comprises interface circuitry 16 and 26, the low pass filter 18, the A/D converter 20, the clock 22, and the dithering circuitry 24. The respective connections between these components are the same as described with reference to FIG. 1a.

Figure 2B:
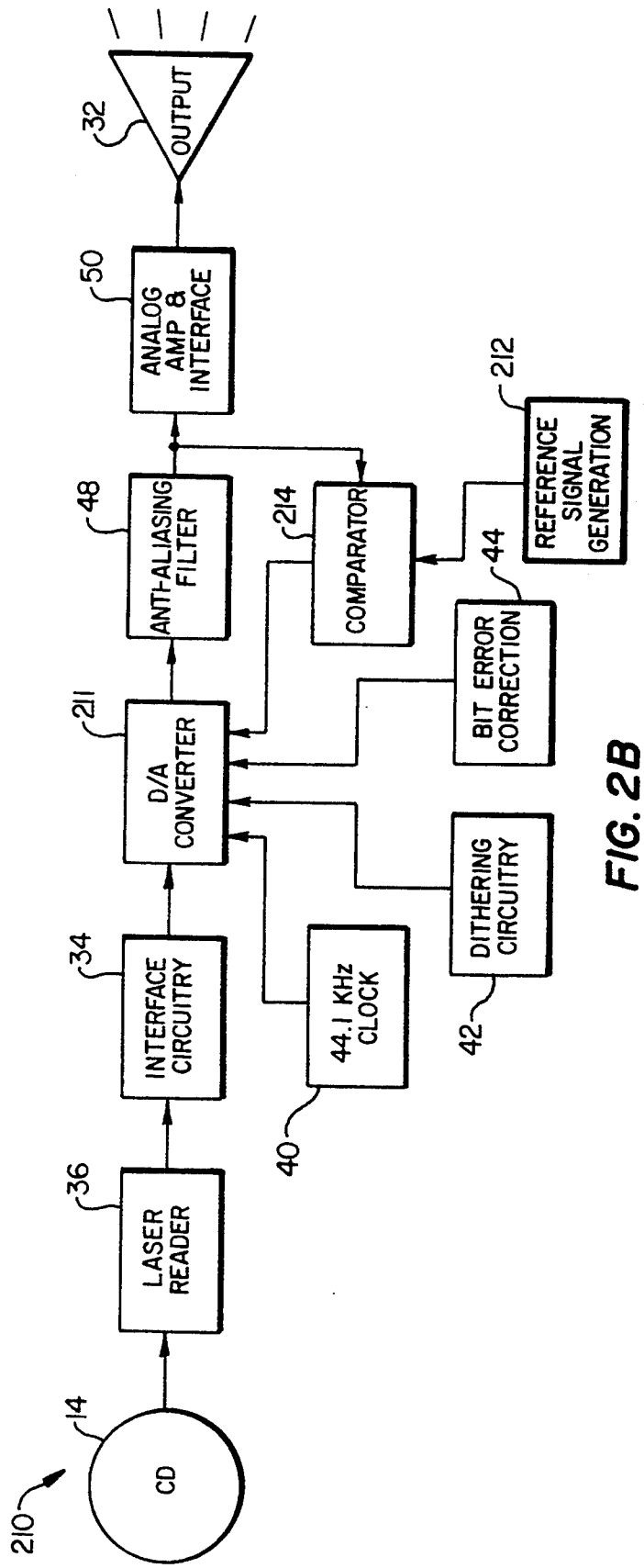
FIG. 2b is a block diagram of a CD playback system embodying features of the present invention.

According to the inventive arrangement shown in FIG. 2b, the system 200 further comprises a reference signal generator 202 connected to the filter 18 for generating an analog form of a digital reference signal (FIG. 3) to be filtered by the filter 18. In a preferred embodiment, the reference signal generator 202 includes a suitable memory device, such as a read only memory (ROM) (not shown), in which a precise reproduction of the reference signal is stored in digital form. The reference signal is read from the ROM and amplified using standard techniques. Since the circuitry components comprising a signal generator are well known, they are not shown and need not be described further.

Accordingly, the reference signal is filtered by the filter 18, digitally encoded by the A/D converter 20 and recorded on the CD 14 in a manner and for purposes which will be subsequently described.

A CD playback system embodying features of the present invention is shown in FIG. 2b and includes several of the components shown in and described in connection with FIG. 1b, which components are given the same reference numerals for the sake of clarity. As in the system 30 of FIG. 1b, the system 210 of FIG. 2b comprises interface circuitry 34, the clock 40, the dithering circuitry 42, the bit error correction circuitry 44, the anti-aliasing filter 48 and the analog amplifier interface 50. The respective connections between these components are the same as described with reference to FIG. 1b. The system 210 also includes a D/A converter 211 which is similar to and connected in the same manner as the D/A converter 38 (FIG. 1b), except that the D/A converter 211 has an additional input for receiving a digital correction signal for relinearizing the system 210, as will be described.

According to the arrangement of FIG. 1b, the system 210 further comprises a reference signal generator 212, similar to the generator 202, which comprises a memory device, such as a ROM, in which is stored a precise replica of the reference signal stored in the memory device of the generator 202. Comparator circuitry 214 is connected to the generator 212, for accessing the reference signal therefrom, and to the output of the filter 48. As will be subsequently described in detail, the comparator circuitry 214 comprises the circuitry necessary for establishing and defining every discernible and measurable difference between the signal generated by the reference signal generator 212 and a signal output by the filter 48 to derive a "difference-information" signal and for converting the difference-information signal into an error correction signal that may be used to render the signals identical with respect to all amplitude components versus both frequency and time thereof. This signal is input to the D/A converter 211, which uses the signal to linearize the amplitude response of the system 210.

FIG. 3 illustrates an analog form of a complex reference signal 300 which may be used to implement the present invention. In general, the reference signal 300 may comprise any number of different waveforms; however, it must, at a minimum, possess the following properties, which must be precisely defined and held to a high tolerance:

1. the amplitude versus frequency components of the signal must fully cover the range of frequencies reproduced by the playback system (e.g., 20-20,000 Hz); and 2. the amplitude versus time components must fully simulate the desired dynamic range of signal amplitudes to be reproduced or the number of digital bits (e.g., 20-24 bits);

In the illustrated embodiment, the reference signal 300 comprises a step pulse 302 of relatively short duration, e.g., approximately 20-50 us, followed by a ramp signal 304 of approximately 1-100 ms duration. The maximum and minimum amplitudes 306 and 308, respectively, of the signal 300 are equal to the amplitude represented by the most significant bit of the digital signal and an amplitude that is at least 100 dB below the maximum amplitude 306, respectively. In other words, the ramp signal 304 must provide a signal whose amplitude versus time components are appropriate for use as a reference signal to correct all relevant nonlinear amplitude responses of the CD recording and playback system.

It is anticipated that a standard reference signal source will be developed for use in the CD recording industry to be used by all participating recording studios, in the form of a "black-box" device corresponding to the generators 202 and 212 that contains a precise reproduction of the reference signal 300 stored in some suitable memory device from which the signal 300 can be easily accessed without loss of precision or accuracy. Each such "black box" will provide a common reference signal to be used in the production of CDs according to the present invention. It should be understood by those skilled in the art that the reference signal 300 will be stored as a digital signal in the memory of the generators 202, 212 and converted to analog form (FIG. 3) prior to being output to the filter 18 and to the comparator circuitry 214, respectively.

In operation, the reference signal 300 is recorded on an information track of the CD 14, using the system 200, prior to the beginning of the audio track(s) so that the signal 300 will be inaudible, or essentially inaudible, to a listener. Once the reference signal has been thus recorded, when the CD 14 is subsequently engaged for playback on the system 210, the reference signal 300 read from the CD 14 may be compared with the reference signal 300 generated by the generator 212 using the comparator circuitry 214.

In conducting the comparison, the circuitry 214 establishes and defines every discernible and measurable difference between two signals to derive a "difference-information" signal and converts the difference-information signal into an error correction signal, which comprises the information necessary to render the signals identical with respect to all amplitude components versus both frequency and time thereof at the output of the D/A converter 211. In accomplishing the correction, the D/A converter 211 incorporates suitable circuitry required to convert all relevant nonlinear properties introduced by both analog and digital circuitry within the recording and playback systems 200 and 210.

This signal is output from the circuitry 214 and input to the D/A converter 211, which incorporates suitable circuitry for the signal 300 to correct any nonlinear frequency and amplitude properties of the system 210 in a manner that results in a degree of accuracy and lack of distortion such that the signals reproduced at the output 32 are virtually indistinguishable from the original signals from the source 12, i.e., the amplitude response of the system is linear.

It is understood that the present invention can take many forms and embodiments. The embodiments shown herein are intended to illustrate rather than to limit the invention, it being appreciated that variations may be made without departing from the spirit or the scope of the invention. For example, the reference signal may comprise any number of different waveforms, such as a rectangular or step-type pulse signal, or a plurality of sine wave signals at various frequencies, which frequencies are chosen such that no two signals have harmonics at the same frequency, so long as the signal has the properties described above. In addition, the present invention may also be applied to systems other than audio systems to achieve a comparable improvement in performance and accuracy of signal reproduction.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of correcting distortion in the playback of audio signals recorded on a compact disc (CD), said distortion caused by nonlinearities in the amplitude versus frequency and amplitude versus time components of the audio signals before and after recording, the method comprising:

recording audio signals and a first reference signal on a CD;

reading said recorded audio signals and said recorded first reference signal from said CD;

comparing said recorded first reference signal with a second reference signal, said second reference signal being identical to said first reference signal prior to said recording; and generating a signal indicative of the difference between said compared signals with respect to amplitude versus frequency components and amplitude versus time components of said compared signals;

combining said difference signal with said read audio signals to produce playback audio signals having the same amplitude versus frequency components and amplitude versus time components as said audio signals prior to said recording, thereby correcting said distortion wherein said first reference signal is recorded on an information track of said CD prior to a plurality of audio tracks of said CD, such that said first reference signal is virtually inaudible to a listener during playback of said CD.

2. The method of claim 1 further comprising digitally encoding said first signal prior to said recording.

3. The method of claim 1 further comprising decoding said read signal subsequent to said reading and prior to said comparing.

4. The method of claim 2 wherein, prior to said digital encoding, said first signal is identical to said second signal.

5. The method of claim 2 wherein said digital encoding is performed by an analog-to-digital converter of said system.

6. The method of claim 3 wherein said decoding is performed by a digital-to-analog converter of said system.

7. The method of claim 1 further comprising using said difference indication signal to correct frequency and amplitude properties of said system such that the amplitude response of said system is linear.

8. The method of claim 1 wherein said first signal is generated by a first circuit connected to said system.

9. The method of claim 1 wherein said second signal is generated by a second circuit connected to said system.

10. The method of claim 1 wherein amplitude versus frequency components of said first signal cover a range of frequencies of audio signals to be reproduced by said system and amplitude versus time components of said first signal fully simulate a dynamic range of amplitudes of said audio signals.

11. A method of correcting distortion caused by nonlinearities in a compact disc (CD) recording and playback system, wherein said system is used for recording audio input signals on a CD and for reproducing said recorded signals during playback of said CD, the method comprising the steps of:

digitally encoding a first signal stored in a first circuit connected to said system;

recording said digitally encoded signal on an information track of said CD;

reading said digitally encoded signal from said CD;

decoding said digitally encoded signal;

comparing said decoded signal with a second signal stored in a second circuit connected to said system, wherein said second signal is identical to said first signal;

responsive to said comparing, generating an error correction signal indicative of a difference between said compared signals; and using said error correction signal to linearize the amplitude response of said system such that said reproduced signals are virtually indistinguishable from said audio input signals corresponding thereto wherein said first signal is recorded on an information track of said CD prior to a plurality of audio tracks of said CD, such that said first signal is virtually inaudible to a listener during playback of said CD.

12. The method of claim 11 wherein amplitude versus frequency components of said first signal encompass a range of frequencies of said recorded signals and amplitude versus time components of said first signal fully simulate a dynamic range of amplitudes of said recorded signals.

13. The method of claim 11 wherein said digital encoding is performed using an analog-to-digital converter of said system.

14. The method of claim 11 wherein said decoding is performed using a digital-to-analog converter of said system.

15. The method of claim 11 wherein said information track precedes a plurality of CD audio tracks which contain said recorded signals.

* * * * *